Oct. 7, 1947.   E. B. FITZGERALD   2,428,561
VEHICLE AIR CONDITIONING SYSTEM ENERGIZED BY BRAKING RESISTORS
Filed May 27, 1944
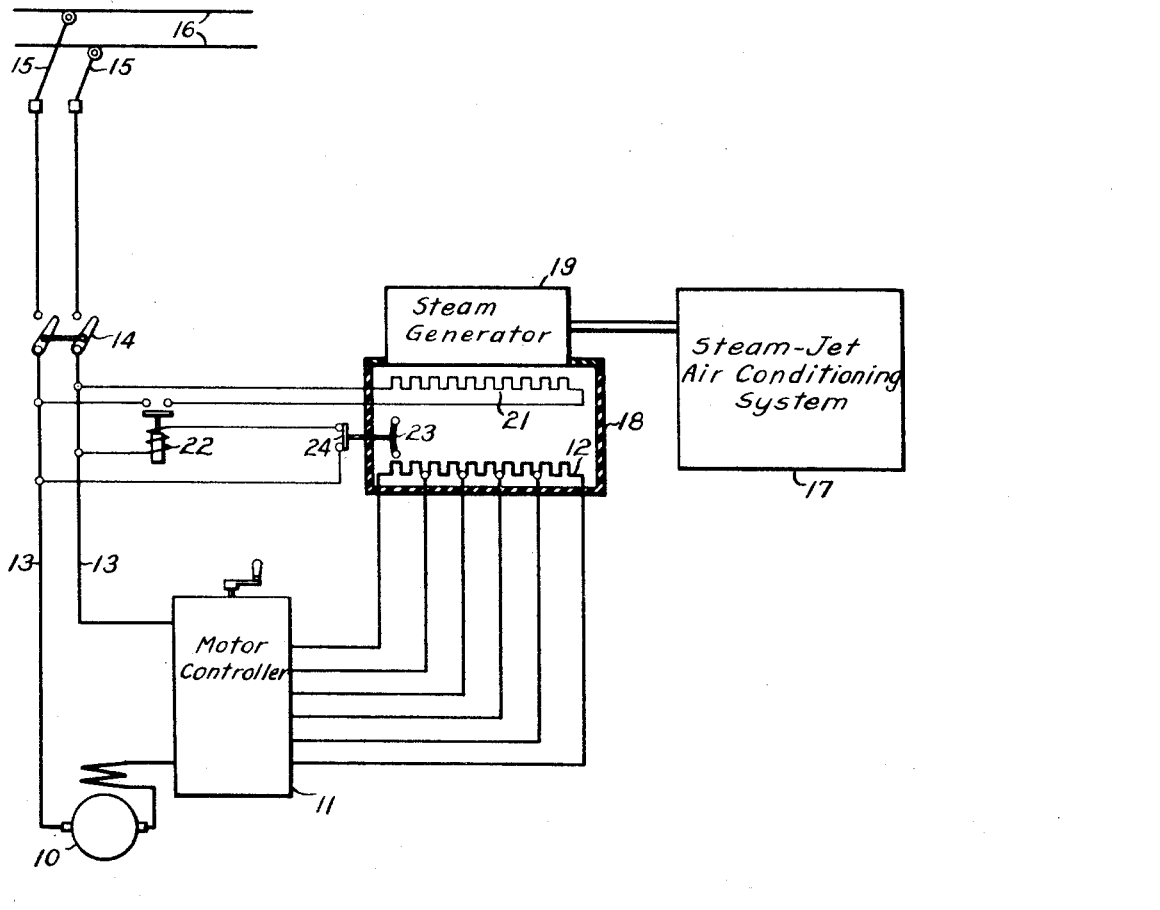
WITNESSES:
INVENTOR
Edward B. Fitzgerald.
BY
Crawford
ATTORNEY Patented Oct. 7, 1947

2,428,561

UNITED STATES PATENT OFFICE 2,428,561

VEHICLE AIR CONDITIONING SYSTEM ENERGIZED BY BRAKING RESISTORS

Edward B. Fitzgerald, Pittsburgh, Pa., assignor to Westinghouse Electric Corporation, East Pittsburgh, Pa., a corporation of Pennsylvania Application May 27, 1944, Serial No. 537,749

7 Claims. (Cl. 62—152)

My invention relates, generally, to air conditioning systems and, more particularly, to air conditioning systems for electrically propelled vehicles, such as trolley coaches and cars.

An object of my invention, generally stated, is to provide an air conditioning system for electrically propelled vehicles which shall be simple and efficient in operation and which may be economically manufactured and installed.

A more specific object of my invention is to provide an economical source of energy for operating an air conditioning system of the steam jet or the absorption type.

Another object of my invention is to provide an air conditioning system for electrically propelled vehicles which will operate satisfactorily under all conditions of operation of the vehicle.

Other objects of my invention will be explained fully hereinafter or will be apparent to those skilled in the art.

In accordance with one embodiment of my invention, the heat losses in the accelerating and dynamic braking resistors of an electrically propelled vehicle are utilized as a source of energy for operating an air conditioning system to cool the interior of the vehicle during warm weather.

For a fuller understanding of the nature and objects of my invention, reference may be had to the following detailed description, taken in conjunction with the accompanying drawings, in which the single figure is a diagrammatic view of an air conditioning system embodying my invention.

Referring to the drawing, the system shown therein comprises a motor 10, which may be of a type suitable for propelling an electric vehicle (not shown), a controller 11 for controlling the operation of the motor in the usual manner, and a resistor 12 which may be utilized to control the motor current both during acceleration and dynamic braking of the vehicle by shunting the resistor from the motor circuit in a plurality of steps in a manner well known in the art. The motor 10 may be supplied with power through a pair of conductors 13, a switch 14, current collectors 15 and trolley conductors 16.

The interior of the vehicle body may be cooled during warm weather by an air conditioning system 17 which may be of either the steam-jet or the absorption type. Since such systems are well known, it is believed to be unnecessary to illustrate the details of their construction in the present application.

In order to provide an economical source of energy for operating such systems, thereby making their utilization in trolley coaches and trolley cars practical, the heat losses from the accelerating and braking resistor 12 may be utilized to generate steam for operating an air conditioning system of the steam-jet type or as the medium for operating a system of the absorption type.

By way of example a system of the steam-jet type is illustrated in the drawing. Accordingly, the resistor 12 is enclosed in a housing 18, and a flash boiler 19, or other suitable apparatus, is disposed to be heated by the heat from the resistor 12. In this manner the heat dissipated by the resistor 12, during the acceleration and dynamic braking cycles, which has previously been discharged to the outside atmosphere during warm weather, may be utilized as a source of energy for operating an air conditioning system to cool the interior of the vehicle.

Under certain conditions of operation, as for example, when the vehicle makes infrequent stops, the heat obtained from the resistor 12 may not be sufficient to maintain the required amount of steam for operating the air conditioning system. Therefore, a supplemental resistor 21 may be also disposed in the housing 18 to heat the steam generator 19.

The resistor 21 may be connected across the power conductors 13 through an electrically operated switch 22, the operation of which may be controlled by a temperature responsive device 23 disposed in the housing 18. The temperature responsive device 23 may be a bimetallic thermostat, having contact members 24 for controlling the energization of the operating coil of switch 22, thereby controlling the energization of the supplemental resistor 21. In this manner when the heat produced by the resistor 12 is insufficient to maintain the temperature required for producing sufficient steam to operate the air conditioning system, the thermostat 23 closes its contact members 24, thereby causing the energization of the resistor 21 to increase the heat supplied to the steam generator 19.

From the foregoing description it is apparent that I have provided an air conditioning system which makes possible the utilization of air conditioning apparatus that has previously been utilized for cooling the air in cars operated on steam railroads and has, therefore, become standardized. The system disclosed herein provides for utilizing such an air conditioning system on electrically propelled vehicles and makes the cost of the energy for the generation of the steam almost negligible, since under the usual operating conditions, heat, which has previously been wasted, is utilized to operate the air conditioning system. In this manner the advantages of air conditioning may be provided for electrically propelled vehicles in an economical manner without materially increasing the cost of operating such vehicles.

Since numerous changes may be made in the above described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In an electrically propelled vehicle having an air conditioning system of the steam jet type for cooling the vehicle, in combination, a motor for propelling the vehicle, control means for controlling the operation of the vehicle, resistance means for controlling the motor current, an enclosure for the resistance means, and means associated with the enclosure for utilizing the heat from said resistance means to generate steam for operating said air conditioning system to cool the interior of the vehicle.

2. In an electrically propelled vehicle having an air conditioning system of the steam jet type for cooling the vehicle, in combination, a motor for propelling the vehicle, control means for controlling the operation of the vehicle, resistance means for controlling the motor current during acceleration and dynamic braking of the vehicle, an enclosure for the resistance means, and means associated with the enclosure for utilizing the heat from said resistance means to generate steam for operating said air conditioning system to cool the interior of the vehicle.

3. In an electrically propelled vehicle having an air conditioning system of the steam jet type for cooling the vehicle, in combination, a motor for propelling the vehicle, control means for controlling the operation of the vehicle, resistance means for controlling the motor current during acceleration and dynamic braking of the vehicle, an enclosure for the resistance means, and means connected to the enclosure for generating steam for said air conditioning system to cool the interior of the vehicle, said steam generating means being heated by heat from said resistance means.

4. In an electrically propelled vehicle having an air conditioning system for cooling the vehicle, in combination, a motor for propelling the vehicle, control means for controlling the operation of the motor, a resistor for controlling the motor current, an enclosure for the resistor, and means connected to the enclosure for utilizing the heat from said resistor as a source of energy for operating said air conditioning system to cool the interior of the vehicle.

5. In an electrically propelled vehicle having an air conditioning system for cooling the vehicle, in combination, a motor for propelling the vehicle, control means for controlling the operation of the motor, a resistor for controlling the motor current during acceleration and dynamic braking of the vehicle, an enclosure for the resistor, and means connected to the enclosure for utilizing the heat from said resistor as a source of energy for operating said air conditioning system to cool the interior of the vehicle.

6. In an electrically propelled vehicle having an air conditioning system for cooling the vehicle, in combination, a motor for propelling the vehicle, control means for controlling the operation of the motor, a resistor for controlling the motor current during acceleration and dynamic braking of the vehicle, an enclosure for the resistor, means connected to the enclosure for utilizing the heat from said resistor as a source of energy for operating said air conditioning system to cool the interior of the vehicle, a supplemental resistor displaced in said enclosure for also supplying heat for operating the air conditioning system, and temperature responsive means for controlling the energization of said supplemental resistor.

7. In an electrically propelled vehicle having an air conditioning system of the steam jet type for cooling the vehicle, in combination, a motor for propelling the vehicle, control means for controlling the operation of the vehicle, resistance means for controlling the motor current during acceleration and dynamic braking of the vehicle, an enclosure for the resistance means, means connected to the enclosure for generating steam for said air conditioning system to cool the interior of the vehicle, said steam generating means being heated by heat from said resistance means, a supplemental resistor disposed in said enclosure for also heating said steam generating means, and temperature responsive means for controlling the energization of said supplemental resistor.

EDWARD B. FITZGERALD.

REFERENCES CITED

The following references are of record in the file of this patent:

UNITED STATES PATENTS

| Number | Name | Date |
|---|---|---|
| 581,557 | Huff | Apr. 27, 1897 |
| 1,535,079 | Smith | Apr. 21, 1925 |
| 2,277,429 | Fiene | Mar. 24, 1942 |
| 2,200,138 | Sauer | May 7, 1940 |
| 2,130,151 | Hirsfeld | Sept. 13, 1938 |
| 1,317,266 | Candee | Sept. 30, 1919 |